[19] United States Patent
Rinkler et al.

[15] 3,673,242
[45] June 27, 1972

[54] SULFONIC ACID BETAINES

[72] Inventors: Heinrich Rinkler, Dormagen; Rudolf Braden, Leverkusen-Schlebusch; Gunther Nischk, Dormagen, all of Germany

[73] Assignee: Farbenfabriken Bayer Aktiengesellschaft, Leverkusen, Germany

[22] Filed: Jan. 6, 1970

[21] Appl. No.: 512

Related U.S. Application Data

[63] Continuation of Ser. No. 588,729, Oct. 24, 1966.

[30] Foreign Application Priority Data

Nov. 2, 1965 Germany..............................F 47575

[52] U.S. Cl....................260/507 R, 260/DIG. 18, 260/78 S, 260/92.8 A, 260/93.7, 260/94.9 GB

[51] Int. Cl.......................................................C07c 143/52
[58] Field of Search......................260/501.12, 513 N, 507 R

[56] References Cited

FOREIGN PATENTS OR APPLICATIONS 1,424,802  12/1965  France...............................260/501.12

Primary Examiner—Leon Zitver
Assistant Examiner—Michael W. Glynn
Attorney—Plumley, Tyner & Sandt

[57] ABSTRACT

Unsaturated sulfonic acid betaines suitable for use as antistatic agents with high polymers are prepared by reacting an unsaturated N,N-disubstituted acid hydrazide with a sultone.

3 Claims, No Drawings

SULFONIC ACID BETAINES

This application is a continuation of our prior copending application Ser. No. 588,729 filed Oct. 24, 1966.

This invention relates to unsaturated sulfonic acid betaines and to a process for their preparation by reacting unsaturated N,N-disubstituted acid hydrazides with sultones.

It is known that aliphatic sultones can be reacted with compounds containing a labile hydrogen atom to form the corresponding ω-sulphonic acids. For example, the reaction of sultones with carbonamide groups gives the corresponding imino esters or N-substitution products with terminal sulphonic acid groups, depending upon the reaction conditions. In addition, it is known that tertiary amines can be alkylated at the nitrogen atom by means of sultones.

The object of this invention are unsaturated sulfonic acid betaines of the formula

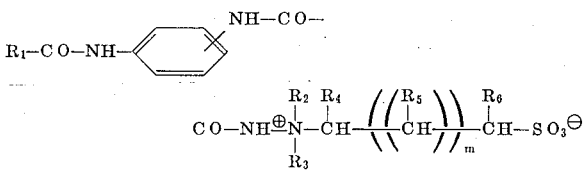

in which $R_1$ represents an alkenyl or an aralkenyl radical, $R_2$ and $R_3$ represent the same or different alkyl radicals with one to four carbon atoms, $R_4$, $R_5$, $R_6$ represents hydrogen or a lower alkyl radical and $m$ is an integer from 1 to 2.

A further object of the invention is a process for the preparation of new unsaturated sulfonic acid betaines which comprises reacting unsaturated N,N-disubstituted acid hydrazides corresponding to the general formula A process for the preparation of new unsaturated sulphonic acid betaines has now been found in which unsaturated N,N-disubstituted acid hydrazides corresponding to the general formula

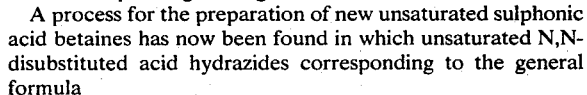

in which $R_1$ represents an alkenyl or an aralkenyl radical and $R_2$ and $R_3$ represent the same or different alkyl radicals, with aliphatic sultones corresponding to the formula

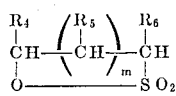

in which $R_4$, $R_5$, $R_6$ represents hydrogen or lower alkyl radicals, and $m$ is an integer from 1 to 2, at temperatures in the range from 0° to 150° C., optionally in the presence of an organic solvent and polymerization inhibitors.

The following compounds, for example, may be used as unsaturated N,N-disubstituted acid hydrazides:
methacrylamido-o-phenylene-N-oxamido-N,N-dimethylhydrazide, methacrylamido-m-phenylene-N-oxamido-N,N-dimethylhydrazide, methacrylamido-p-phenylene-N-oxamido-N,N-diethylhydrazide, crotonylamido-o-phenylene-N-oxamido-N,N-dimethylhydrazide, crotonylamido-m-phenylene-N-oxamido-N,N-dimethylhydrazide, crotonylamido-p-phenylene-N-oxamido-N,N-diemthylhydrazide, cinnamylamido-o-phenylene-N-oxamido-N,N-dimethylhydrazide, cinnamylamido-m-phenylene-N-oxamido-N,N-diethylhydrazide, cinnamylamido-p-phenylene-N-oxamido-N,N-dimethylhydrazide, methacrylamido-o-phenylene-N-oxamido-N,N-diethylhydrazide.

The resulting unsaturated sulphonic acid betaines have the formula

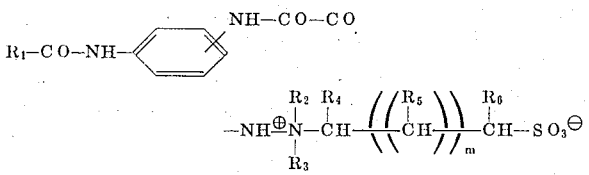

in which $R_1$ represents an alkenyl radical or an aralkenyl radical, $R_2$ and $R_3$ represent the same or different alkyl radicals, $R_4$, $R_5$, $R_6$ represents hydrogen or lower alkyl radicals and $m$ is an integer from 1 to 2. Preferred alkyl radicals are those with one to four carbon atoms.

The unsaturated N,N-disubstituted acid hydrazides may be prepared, for example, as follows: The known (o-, m-, p-nitrophenyl)-oxalic acid ethyl esters are catalytically hydrogenated to the corresponding (o-, m-, p-aminophenyl)-oxalic acid ethyl esters. The action of N,N-disubstituted hydrazines results in the formation of N,N-disubstituted oxalic acid hydrazides which can be reacted, for example, with unsaturated acid chlorides.

The unsaturated phenylene-oxamido-dialkyl-hydrazides obtained in this way are then reacted, preferably in organic solvents, with aliphatic sultones, for example 1,3-propane sultone or 1,4-butane sultone, advantageously at elevated temperature. The products of alkylation accumulate in crystallized form and can be isolated by straightforward filtration in vacuo. Preferred solvents are those in which the starting products are soluble. Solvents of this kind include, in particular, polar organic solvents such as aliphatic nitriles, for example, acetonitrile or propionitrile, or N,N-disubstituted formamides, for example dimethyl formamide. The process according to the invention is carried out at room temperature or at elevated temperatures up to 150° C., preferably at temperatures between 40° and 100° C. Suitable polymerization inhibitors are, for example, tert.-butyl-pyrocatechol or phenothiazine.

It is surprising that the products according to the invention can be obtained in the form of uniform compounds because the starting compounds contain four nitrogen atoms which could have reacted with the sultones. Accordingly, all these nitrogen atoms had been expected to react with sultones, which would have resulted in the formation of completely undefined products. In contrast, only the N,N-disubstituted nitrogen atom of the hydrazide group is quaternized into a uniform compound in yields of up to 90 percent.

The new compounds are suitable for use as anti-static agents. It is possible, with the aid of these compounds, considerably to improve the antistatic properties of high polymers, such as polyvinyl chloride, polyethylene, polypropylene and polyamides by working them in (on mixing rolls) in quantities of between 0.1 and 5 percent by weight, based on the high polymers. The following examples illustrate more specifically the instant invention:

EXAMPLE 1

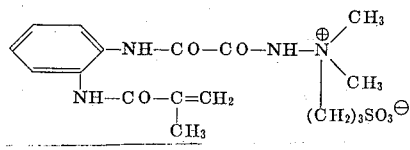

Two hundred and thirty-eight parts by weight of (o-nitrophenyl)-oxalic acid ethyl ester are dissolved in 1500 parts by weight of dioxan and, following the addition of 50 parts by weight of Raney nickel, are hydrogenated to form (o-aminophenyl)-oxalic acid ethyl ester. Yield = 175 parts by weight, m.p. 101° C.

Two hundred and eight parts by weight of (o-aminophenyl)-oxalic acid ethyl ester are dissolved in 750 parts by weight of ethanol and 70 parts by weight of N,N-dimethylhydrazine are added dropwise to the resulting solution at a temperature of 60° C. After a brief reaction (approximately 1 hour), the resulting hydrazide is precipitated on cooling and can be filtered off. Yield = 180 parts by weight, (decomposition point 200° C.).

Two hundred and twenty-two parts by weight of o-aminophenylene-N-oxamido-N,N-dimethylhydrazide are dissolved in 1,000 parts by weight of methylene chloride. One hundred and seventeen parts by weight of soda and one to two parts by weight of tert.-butyl-pyrocatechol as stabilizer are then added to the resulting solution. One hundred and fifteen parts by weight of methacryl chloride are then added dropwise at 0° to 10° C. over a period of 1 to 2 hours. Stirring is continued for 3 hours at room temperature, after which the precipitate is filtered off and stirred with 1,000 to 2,000 parts by weight of water and the residue filtered off. Yield = 220 parts by weight, (decomposition point 210°–215° C.).

One-hundred and thirty parts by weight of 1,3-propane sultone are added to 290 parts by weight of methacryl-amido-o-phenylene-N-oxamido-N,N-dimethyl hydrazide and 2 to 5 parts by weight of tert.-butyl-pyrocatechol in 1,000 parts by weight of acetonitrile. The mixture is stirred for 12 hours at room temperature, and then reacted for 24 to 48 hours at 20° C. The quaternized product accumulates in crystallized form and can be filtered off. Yield 340 parts by weight, (decomposition point 210°–215° C.).

EXAMPLE 2

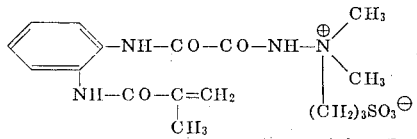

Two hundred and thirty-eight parts by weight of (m-nitrophenyl)-oxalic acid ethyl ester are dissolved in 1,000 parts by weight of dioxan and, following the addition of 40 g. of Raney nickel, are hydrogenated to form (m-aminophenyl)-oxalic acid ethyl ester. Yield = 181 parts by weight, m.p. 105° C.

Two hundred and eight parts by weight of (m-aminophenyl)-oxalic acid ethyl ester are dissolved in 750 parts by weight of ethanol and 70 parts by weight of N,N-dimethylhydrazine are added dropwise to the resulting solution at a temperature of 60° C. After a brief reaction time (1 to 2 hours), the resulting hydrazide precipitates on cooling and can be filtered off. Yield = 190 parts by weight (decomposition point 205°–208° C.).

Two hundred and twenty-two parts by weight of m-aminophenylene-N-oxamido-N,N-dimethyl hydrazide are dissolved in 1,000 parts by weight of methylene chloride. One hundred and seventeen parts by weight of soda and one to two parts by weight of tert.-butyl-pyrocatechol as stabilizer are then added to the resulting solution. One hundred and fifteen parts by weight of methacryl chloride are then added dropwise over a period of 1 to 2 hours at 0° to 10° C. The mixture is stirred at room temperature for 3 hours and the precipitate is filtered off and stirred with 1,000 to 2,000 parts by weight of water and the residue is filtered off. Yield = 230 parts by weight (decomposition point 215°–220° C.).

One hundred and thirty parts by weight of 1,3-propane sultone are added to 290 parts by weight of methacrylamido-m-phenylene-N-oxamido-N,N-dimethyl hydrazide and two to five parts by weight of tert.-butyl-pyrocatechol in 1,000 parts by weight of acetonitrile. The mixture is stirred for 12 hours at room temperature and then reacted for 24 to 48 hours at 80° C. The quaternized product accumulates in crystallized form and can be filtered off. Yield = 350 parts by weight, (decomposition point 212°–215° C.).

EXAMPLE 3

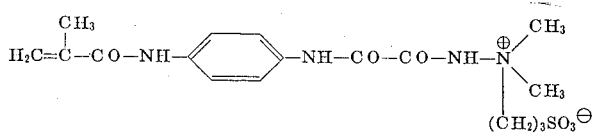

Two hundred and thirty-eight parts by weight of (p-nitrophenyl)-oxalic acid ethyl ester are dissolved in 1,500 parts by weight of dioxan and, following the addition of 40 g. of Raney nickel, are hydrogenated to form (p-aminophenyl)-oxalic acid ethyl ester. Yield = 177 parts by weight, m.p. 121° C.

Two hundred and eight parts by weight of (p-aminophenyl)-oxalic acid ethyl ester are dissolved in 750 parts by weight of ethanol, and 70 parts by weight of N,N-dimethyl hydrazine are added dropwise to the resulting solution at a temperature of 60° C. After a brief reaction time of 1 to 2 hours, the resulting hydrazide precipitates on cooling and can be filtered off. Yield = 188 parts by weight (decomposition point 230° C.).

Two hundred and twenty-two parts by weight of p-aminophenylene-N-oxamido-N,N-dimethyl hydrazide are dissolved in 1,000 parts by weight of methylene chloride. One hundred and seventeen parts by weight of soda and one to two parts by weight of tert.-butyl pyrocatechol as stabilizer are then added to the resulting solution.

One hundred and fifteen parts by weight of methacryl chloride are then added dropwise at 0° to 10° C. over a period of 1 to 2 hours. The mixture is stirred for 3 hours at room temperature, and the precipitate is filtered off and stirred with 1,000 to 2,000 parts by weight of water and the residue filtered off. Yield = 225 parts by weight (decomposition point 255° C.).

One hundred and thirty parts by weight of 1,3-propane sultone are added to 290 parts by weight of methacrylamido-p-phenylene-N-oxamido-N,N-dimethyl hydrazide and 2 to 5 parts by weight of tert.-butyl pyrocatechol in 1,000 parts by weight of acetonitrile. The mixture is stirred for 12 hours at room temperature and then reacted for 24 to 48 hours at 80° C. The quaternised product accumulates in crystallized form and can be filtered off. Yield = 348 parts by weight (decomposition point 220°–225° C.).

We claim:

1. An unsaturated sulfonic acid betaine of the formula

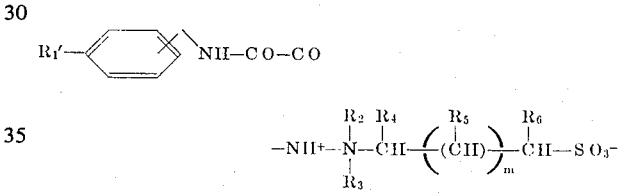

wherein $R_1'$ is selected from the group consisting of methacrylamido, crotonylamido, and cinnamylamido; $R_2$ and $R_3$ represent the same or different alkyl radicals containing one to four carbon atoms;

$R_4$, $R_5$ and $R_6$ are selected from the group consisting of hydrogen and lower alkyl radicals; and $m$ is an interger from 1 to 2.

2. An unsaturated sulfonic acid betaine of the formula

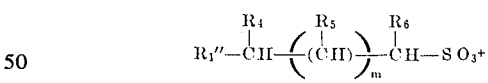

wherein $R_1''$ is selected from the group consisting of methacrylamido-o-phenylene-N-oxamido-N,N-dimethylhydrazinium methacrylamido-m-phenylene-N-oxamido-N,N-dimethylhydrazinium methacrylamido-p-phenylene-N-oxamido-N,N-diethylhydrazinium crotonylamido-o-phenylene-N-oxamido-N,N-dimethylhydrazinium crotonylamido-m-phenylene-N-oxamido-N,N-dimethylhydrazinium crotonylamido-p-phenylene-N-oxamido-N,N-dimethylhydrazinium cinnamylamido-o-phenylene-N-oxamido-N,N-dimethylhydrazinium cinnamylamido-m-phenylene-N-oxamido-N,N-diethylhydrazinium cinnamylamido-p-phenylene-N-oxamido-N,N-dimethylhydrazinium and methacrylamido-o-phenylene-N-oxamido-N,N-diethylhydrazinium;

$R_4$, $R_5$ and $R_6$ are selected from the group consisting of hydrogen and lower alkyl radicals; and $m$ is an integer from 1 to 2.

3. The unsaturated sulfonic acid betaine of the formula

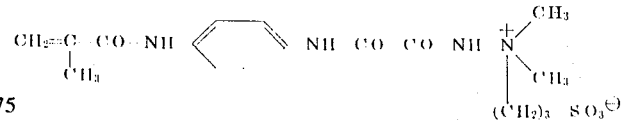

* * * * *